US009976013B2

(12) United States Patent
Kawai

(10) Patent No.: US 9,976,013 B2
(45) Date of Patent: May 22, 2018

(54) RUBBER-SILICA COMPOSITE AND METHOD FOR PRODUCING SAME, AND RUBBER COMPOSITION AND PNEUMATIC TIRE

(71) Applicant: Toyo Tire & Rubber Co., Ltd., Osaka-shi, Osaka (JP)

(72) Inventor: Nobutomo Kawai, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 232 days.

(21) Appl. No.: 14/905,149

(22) PCT Filed: May 15, 2014

(86) PCT No.: PCT/JP2014/002565
§ 371 (c)(1),
(2) Date: Jan. 14, 2016

(87) PCT Pub. No.: WO2015/015679
PCT Pub. Date: Feb. 5, 2015

(65) Prior Publication Data
US 2016/0145423 A1     May 26, 2016

(30) Foreign Application Priority Data

Jul. 31, 2013  (JP) ................................ 2013-159427
Jul. 31, 2013  (JP) ................................ 2013-159430

(51) Int. Cl.
| | |
|---|---|
| *C08K 3/36* | (2006.01) |
| *C08L 7/02* | (2006.01) |
| *C08C 19/08* | (2006.01) |
| *B60C 1/00* | (2006.01) |
| *C08C 19/25* | (2006.01) |
| *C08G 77/442* | (2006.01) |
| *C08L 83/10* | (2006.01) |
| *C08L 15/00* | (2006.01) |

(52) U.S. Cl.
CPC ................ *C08L 7/02* (2013.01); *B60C 1/00* (2013.01); *C08C 19/08* (2013.01); *C08C 19/25* (2013.01); *C08G 77/442* (2013.01); *C08K 3/36* (2013.01); *C08L 83/10* (2013.01); *C08L 15/00* (2013.01)

(58) Field of Classification Search
CPC . C08K 3/36; C08L 19/08; C08L 19/25; C08F 16/34; C08F 16/36; C08F 116/34; C08F 116/36; C08F 216/34; C08F 216/36
See application file for complete search history.

(56) References Cited

U.S. PATENT DOCUMENTS

| | | | | |
|---|---|---|---|---|
| 4,851,556 A | * | 7/1989 | Siegmeier | ............... C08C 19/06 549/525 |
| 5,015,692 A | * | 5/1991 | Takao | ..................... C08C 19/42 525/102 |
| 5,622,998 A | | 4/1997 | Tanaka et al. | |
| 6,133,388 A | | 10/2000 | Lee et al. | |
| 6,462,141 B1 | | 10/2002 | Kim et al. | |
| 9,175,124 B2 | * | 11/2015 | Chaboche | ............. B60C 1/0016 |
| 2004/0266937 A1 | | 12/2004 | Yagi et al. | |
| 2007/0010610 A1 | | 1/2007 | Kondo | |
| 2009/0203843 A1 | * | 8/2009 | Fukuoka | ................. C08C 19/44 525/105 |
| 2009/0275675 A1 | | 11/2009 | Yagi et al. | |
| 2010/0063202 A1 | * | 3/2010 | Halasa | .................... C08C 19/44 524/572 |
| 2011/0028653 A1 | * | 2/2011 | Wang | ........................ C08F 8/00 525/207 |
| 2012/0252966 A1 | * | 10/2012 | Ito | .......................... C08C 19/25 524/575 |
| 2012/0323037 A1 | * | 12/2012 | Pilard | ..................... C08C 19/08 560/262 |
| 2013/0023624 A1 | * | 1/2013 | Sekikawa | ............... C08C 19/44 524/572 |
| 2013/0245192 A1 | | 9/2013 | Tanaka et al. | |

(Continued)

FOREIGN PATENT DOCUMENTS

| | | |
|---|---|---|
| CN | 102344638 A | 2/2012 |
| DE | 199 22 639 A1 | 11/2000 |

(Continued)

OTHER PUBLICATIONS

Office Action dated Nov. 22, 2017, issued in counterpart Chinese Application No. 201480043579.8, with English machine translation. (14 pages).
International Search Report dated Aug. 19, 2014, issued in counterpart Application No. PCT/JP2014/002565 (2 pages).
Office Action dated Mar. 31, 2017, issued in counterpart German Patent Application No. 11 2014 003 521.1, with English translation. (12 pages).
Office Action dated Apr. 25, 2017, issued in counterpart Chinese Patent Application No. 201480043579.8, with English translation. (13 pages).

*Primary Examiner* — Peter D. Mulcahy
(74) *Attorney, Agent, or Firm* — Westerman, Hattori, Daniels & Adrian, LLP

(57) ABSTRACT

Acido-basic properties of a system containing a polymer fragment obtained by oxidative cleavage of a carbon-carbon double bond of a diene rubber polymer and a functional molecule having in a structure thereof an alkoxysilyl group and at least one functional group selected from the group consisting of an aldehyde group and a carbonyl group are changed such that the system becomes basic when acidic, and becomes acidic when basic, thereby combining the polymer fragment with the functional molecule to form a modified diene rubber polymer having an alkoxysilyl group incorporated therein. A silane monomer comprising tetraalkoxysilane and/or alkyl trialkoxysilane is added to the system containing the modified diene rubber polymer, followed by condensation polymerization, thereby forming silica.

14 Claims, No Drawings

(56) References Cited

U.S. PATENT DOCUMENTS

2014/0364536 A1 12/2014 Kawai
2016/0362504 A1* 12/2016 Dire ..................... B60C 1/0016

FOREIGN PATENT DOCUMENTS

| | | |
|---|---|---|
| EP | 0 767 179 A2 | 4/1997 |
| JP | 62-39644 A | 2/1987 |
| JP | 8-81505 A | 3/1996 |
| JP | 2000-248014 A | 9/2000 |
| JP | 2000-273126 A | 10/2000 |
| JP | 2004-359716 A | 12/2004 |
| JP | 2004-359773 A | 12/2004 |
| JP | 2005-41960 A | 2/2005 |
| JP | 2005-179436 A | 7/2005 |
| JP | 2005-232261 A | 9/2005 |
| JP | 2010-229253 A | 10/2010 |
| JP | 2012-27374 A | 2/2012 |
| JP | 2012-27376 A | 2/2012 |
| JP | 2012-251085 A | 12/2012 |
| JP | 2013-129693 A | 7/2013 |
| WO | 2010/011345 A1 | 1/2010 |
| WO | 2012/073880 A1 | 6/2012 |
| WO | 2013/118496 A1 | 8/2013 |

* cited by examiner

RUBBER-SILICA COMPOSITE AND METHOD FOR PRODUCING SAME, AND RUBBER COMPOSITION AND PNEUMATIC TIRE

TECHNICAL FIELD

The present invention relates to a rubber-silica composite that is a composite of a diene rubber polymer and silica. The invention further relates to a method for producing the composite, a rubber composition using the rubber-silica composite, and a pneumatic tire.

BACKGROUND ART

Terminal structure modification or a technology of directly adding a functional group to a side chain or adding a functional group by grafting a polymer is used as a technology for changing the characteristics of natural rubber or a synthetic rubber (for example, see PTLs 1 to 6). Such a modified diene rubber polymer is used in, for example, a rubber composition to improve the properties thereof; and is required to improve compatibility with a filler such as silica.

To improve dispersibility of silica in a diene rubber polymer, a technology of producing a silica masterbatch by mixing a silica slurry with a polymer emulsion such as a natural rubber latex, followed by coagulation and drying, is known (for example, see PTLs 7 and 8). Such a silica masterbatch is obtained by mixing silica with a rubber polymer in water (that is, wet mixing), and is called a wet masterbatch. However, a material having a hydrophilic silanol group on the surface thereof such as silica, frequently involves the case that incorporation of the material in a hydrophobic rubber polymer becomes insufficient. Therefore, there is a technology of improving the incorporation property by hydrophobicizing the surface of silica. However, dispersibility of hydrophobicized silica in water is deteriorated in wet mixing. As a result, the silica incorporated is likely to be present in a rubber polymer in a coagulated state, and this may deteriorate uniformity in kneading a rubber composition.

PTL 9 listed below discloses a depolymerized natural rubber useful as an adhesive, a pressure-sensitive adhesive or the like. In this literature, a liquid depolymerized natural rubber having a number average molecular weigh of from 2,000 to 50,000 is produced by subjecting a deproteinized natural rubber dissolved in an organic solvent to air oxidation in the presence of a metal catalyst to depolymerize the deproteinized natural rubber. This literature discloses that a main chain is decomposed by air oxidation to form a molecular chain having a carbonyl group at one terminal and a formyl group at other terminal, and the formyl group is recombined by aldol condensation. However, in this literature, the depolymerization is conducted in a solution of an organic solvent, and this literature does not disclose that the recombination is performed by changing a system containing a decomposed polymer to basicity from acidity or to acidity from basicity. Furthermore, this literature has an object to obtain a liquid depolymerized natural rubber by decomposing a natural rubber into low molecules, and does not suggest a composite with silica as a reinforcing agent.

CITATION LIST

Patent Literature

PTL 1: JP-A-62-039644
PTL 2: JP-A-2000-248014
PTL 3: JP-A-2005-232261
PTL 4: JP-A-2005-041960
PTL 5: JP-A-2004-359716
PTL 6: JP-A-2004-359773
PTL 7: JP-A-2005-179436
PTL 8: WO 2010/011345
PTL 9: JP-A-08-081505

SUMMARY OF INVENTION

Technical Problem

The present inventors previously propose a novel modification method of a polymer that can simply incorporate a functional group in a main chain structure and a rubber composition containing a modified polymer in Japanese Patent Application No. 2012-27374 and Japanese Patent Application No. 2012-27376. The present invention relates to a technology of forming a composite of a rubber polymer and silica by utilizing such a modification method. That is, the present invention has an object to provide a novel rubber-silica composite that can improve dispersibility of silica.

Solution to Problem

A method for producing a rubber-silica composite according an embodiment comprises changing acido-basic properties of a system containing a polymer fragment obtained by decomposing a diene rubber polymer having a carbon-carbon double bond in a main chain by subjecting the carbon-carbon double bond to oxidative cleavage and a functional molecule having in a structure thereof an alkoxysilyl group and at least one functional group selected from the group consisting of an aldehyde group and a carbonyl group such that the system becomes basic when acidic, and becomes acidic when basic, thereby combining the polymer fragment with the functional molecule to form a modified diene rubber polymer having an alkoxysilyl group incorporated therein, and adding a silane monomer comprising tetraalkoxysilane and/or alkyl trialkoxysilane to the system containing the modified diene rubber polymer, followed by condensation polymerization, thereby forming silica.

A rubber-silica composite according to an embodiment comprises a modified diene rubber polymer having incorporated in a molecule thereof at least one selected from the group consisting of groups containing a silicon atom represented by the following formulae (D1) to (D4), and silica bonded to the silicon atom of the modified diene rubber polymer through a siloxane bond.

[Chem. 1]

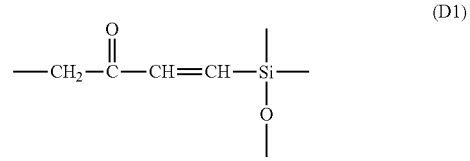

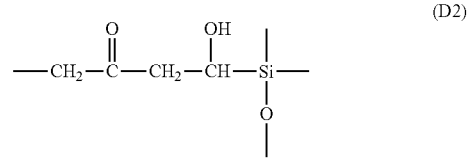

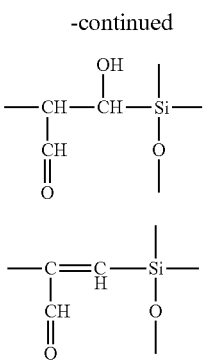

(D3)

(D4)

A rubber composition according to an embodiment contains the rubber-silica composite. A pneumatic tire according to an embodiment comprises the rubber composition.

Advantageous Effects of Invention

According to the present embodiment, a diene rubber polymer is decomposed by subjecting a double bond in a main chain thereof to oxidative cleavage to once decrease its molecular weight, and acido-basic properties of a system containing a polymer fragment obtained are then changed, thereby recombination can be performed. In such a case, by containing a functional molecule having an alkoxysilyl group as a structure in the system, the alkoxysilyl group can be easily incorporated in the diene rubber polymer. Furthermore, by condensation polymerizing the silane monomer to the modified diene rubber polymer having the alkoxysilyl group thus incorporated therein, silica particles having the alkoxysilyl group as an origin can be formed. That is, silica is formed in the state of bonding to the diene rubber polymer. As a result, dispersibility of silica to a diene rubber polymer can be improved.

DESCRIPTION OF EMBODIMENTS

In the present embodiment, the polymer to be modified includes a diene rubber polymer containing a carbon-carbon double bond in a main chain thereof (hereinafter, also simply referred to as a rubber polymer or a polymer). Examples of the diene rubber polymer include various rubber polymers having an isoprene unit and/or a butadiene unit in the molecule, and specifically include natural rubber (NR), synthetic isoprene rubber (IR), butadiene rubber (BR), styrene-butadiene ribber (SBR), nitrile rubber (NBR), chloroprene rubber (CR), butyl rubber (IIR), styrene-isoprene copolymer rubber, butadiene-isoprene copolymer rubber and styrene-isoprene-butadiene copolymer rubber. Those rubber polymers may be used in any one kind alone or as mixtures of two or more kinds thereof. Of those, natural rubber, synthetic isoprene rubber, styrene-butadiene rubber or butadiene rubber is preferably used, and natural rubber or synthetic isoprene rubber is more preferably used.

A diene rubber polymer having a number average molecular weight of 60,000 or more is preferably used as the diene rubber polymer to be modified. The reason for this is that a polymer in a solid state at the ordinary temperature (23° C.) is intended to use in the present embodiment. For example, for that a rubber polymer does not undergo plastic deformation in a state of not applying force at the ordinary temperature in directly processing the rubber polymer as a material, the number average molecular weight is preferably 60,000 or more. The term "solid state" used herein means the state free of flowability. The number average molecular weight of the diene rubber polymer is preferably from 60,000 to 1,000,000, more preferably from 80,000 to 800,000, and still more preferably from 100,000 to 600,000.

A diene rubber polymer dissolved in a solvent can be used as the diene rubber polymer to be modified. Preferably, an aqueous emulsion in which the rubber polymer is present in a micelle state in water as a protic solvent, that is, a latex, is used. When the aqueous emulsion is used, after decomposing the rubber polymer, a recombination reaction of polymer fragments to each other and a combining reaction with a functional molecule can be induced by changing acido-basic properties of a reaction field while maintaining the state. The concentration of the aqueous emulsion (solid concentration of a rubber polymer) is not particularly limited. The concentration is preferably from 5 to 70 mass %, and more preferably from 10 to 50 mass %. Where the solid concentration is too high, emulsion stability is deteriorated, and a micelle is easily destroyed due to pH fluctuation of a reaction field. This is not suitable for a reaction. On the other hand, where the solid concentration is too low, reaction rate becomes slow, resulting in poor practical use.

To subject a carbon-carbon double bond in the diene rubber polymer to oxidative cleavage, an oxidizing agent can be used. For example, the oxidative cleavage can be performed by adding an oxidizing agent to the aqueous emulsion of the diene rubber polymer, followed by stirring. Examples of the oxidizing agent include manganese compounds such as potassium permanganate and manganese oxide; chromium compounds such as chromic acid and chromium trioxide; peroxides such as hydrogen peroxide; perhalogen acids such as periodic acid; and oxygens such as ozone and oxygen. Of those, periodic acid is preferably used. Use of periodic acid makes it easy to control a reaction system. Furthermore, since a water-soluble salt is formed, when the modified polymer is solidified and dried, the water-soluble salt can remain in water, and the amount of residual water-soluble salt in the modified polymer is small. In performing the oxidative cleavage, a metal oxidation catalyst, for example, a salt or a complex between a metal such as cobalt, copper or iron, and a chloride or an organic compound, may be concurrently used. For example, air oxidation may be conducted in the presence of the metal oxidation catalyst.

The diene rubber polymer is decomposed by the oxidative cleavage, and a polymer having a carbonyl group (>C=O) or an aldehyde group (that is, a formyl group (—CHO)) at a terminal (the polymers are hereinafter referred to as polymer fragments) is obtained. As one embodiment, the polymer fragment has a structure represented by the following formula (5) at the terminal.

[Chem. 2]

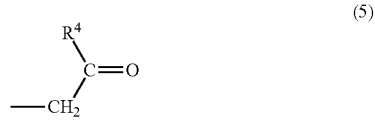

In the formula (5), $R^4$ represents a hydrogen atom, an alkyl group having from 1 to 5 carbon atoms, or a halogen group, and is more preferably a hydrogen atom, a methyl group or a chloro group. For example, in the case where an isoprene unit is cleaved, $R^4$ is a methyl group at one cleavage terminal and $R^4$ is a hydrogen atom at other cleavage terminal. In the case where a butadiene unit is cleaved, $R^4$ is a hydrogen group at both terminals. In the case where a chloroprene unit is cleaved. $R^4$ is a chloro group at one cleavage terminal, and $R^4$ is a hydrogen atom at other cleavage terminal. In more detail, the polymer fragment has the structure represented by the above formula (5) in at least one terminal of a molecular chain thereof. That is, a polymer fragment having the group represented by the formula (5) directly bonded to one terminal or both terminals of a diene polymer chain is formed, as shown in the following formulae (6) and (7).

[Chem. 3]

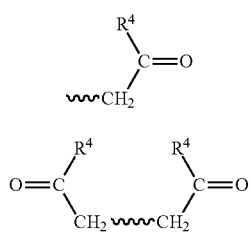

In the formulae (6) and (7), $R^4$ represents a hydrogen atom, an alkyl group having from 1 to 5 carbon atoms, or a halogen group, and a portion indicated by a wavy line is a diene polymer chain. For example, in the case of decomposing natural rubber, the portion indicated by a wavy line is a polyisoprene chain comprising a repeating structure of an isoprene unit. In the case of decomposing styrene-butadiene rubber, the portion indicated by a wavy line is a random copolymer chain containing a styrene unit and a butadiene unit.

When the diene rubber polymer is decomposed by the oxidative cleavage, a molecular weight thereof is decreased. The number average molecular weight of the polymer after decomposition is not particularly limited. The number average molecular weight is preferably from 300 to 500,000, more preferably from 500 to 100,000, and still more preferably from 1,000 to 50,000. The amount of functional groups after recombination can be adjusted by a size of a molecular weight after decomposition. Where the molecular weight when decomposed is too small, a combining reaction is liable to occur in the same molecule.

After decomposing the diene rubber polymer as described above, acido-basic properties of a reaction system containing the polymer fragment obtained and a functional molecule having an alkoxysilyl group as a structure are changed such that the system becomes basic when acidic, and becomes acidic when basic.

The functional molecule having an alkoxysilyl group as a structure is a compound having at least one functional group selected from the group consisting of an aldehyde group and a carbonyl group together with an alkoxysilyl group in the molecule. Specifically, the compound includes a functional molecule represented by the following formula (A).

[Chem. 4]

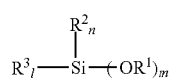

In the formula (A), $R^1$ represents an alkyl group or an alkoxyalkyl group, having from 1 to 6 carbon atoms. $R^2$ represents a group containing an aldehyde group or a carbonyl group. $R^3$ represents an alkyl group. m is an integer of from 1 to 3, n is an integer of from 1 to 3 and l is an integer of from 0 to 2. The sum of m, n and l is 4.

$R^1$ represents more preferably an alkyl group having from 1 to 4 carbon atoms. Examples of an alkoxy group represented by $OR^1$ include a methoxy group, an ethoxy group, a propoxy group, a butoxy group and a methoxyethoxy group.

$R^2$ is a functional group for combining with the polymer fragment, and the number of $R^2$ represented by n is the number of functional groups to the polymer fragment. $R^2$ may be an aldehyde group (—CHO) or a carbonyl group (—$COR^5$), and may be a group in which the aldehyde group or carbonyl group is bonded to a silicon atom through an alkanediyl group (that is, —$R^6$—CHO or —$R^6$—CO—$R^5$). $R^5$ represents an alkyl group having from 1 to 5 carbon atoms, and is more preferably a methyl group. $R^6$ is not particularly limited, but is preferably an alkanediyl group having from 1 to 5 carbon atoms, and more preferably a methylene group. Specific examples of $R^2$ include —CHO, —$COCH_3$ and —$CH_2CHO$.

$R^3$ represents more preferably an alkyl group having from 1 to 6 carbon atoms, and still more preferably an alkyl group having from 1 to 3 carbon atoms.

The functional molecule having an alkoxysilyl group as a structure, in more detail, the functional molecule represented by the above formula (A), can be obtained by subjecting a carbon-carbon double bond of a functional molecule having at least one vinyl group to oxidative cleavage. That is, when a vinyl group is subjected to oxidative cleavage, an aldehyde group or a carbonyl group is formed. The oxidative cleavage can be conducted according to an oxidative cleavage reaction of the diene rubber polymer. In detail, the diene rubber polymer and the functional molecule having a vinyl group may be subjected to oxidative cleavage by adding an oxidizing agent in the separate systems, respectively. Alternatively, the diene rubber polymer and the functional molecule having a vinyl group may be previously mixed, and the resulting mixture is then subjected to oxidative cleavage by adding an oxidizing agent to the mixing system. Preferably, after subjecting the diene rubber polymer to oxidative cleavage, the functional molecule having a vinyl group is added to the reaction system, thereby subjecting the functional molecule to oxidative cleavage, and thereafter, acido-basic properties of the reaction system obtained are changed. In the case where the diene rubber polymer and the functional molecule having a vinyl group have been separately subjected to oxidative cleavage, those are mixed, and acido-basic properties of a mixed liquid are changed.

Preferred specific examples of the functional molecule having a vinyl group include vinyltrimethoxysilane, vinyltriethoxysilane, vinyltriisopropoxysilane, vinyltris(methoxyethoxy)silane, methylvinyldimethoxysilane, methylvinyldiethoxysilane, allyltrimethoxysilane, allyltriethoxysilane, divinyldiethoxysilane, divinyldimethoxysilane, divinylmethylmethoxysilane, divinylmethylethoxysilane, trivinylethoxysilane and trivinylmethoxysilane. Those may be used in any one kind alone or as mixtures of two or more kinds thereof.

As described above, the polymer fragment can be recombined and additionally the polymer fragment can be combined with the functional molecule by changing acido-basic properties of the reaction system containing the polymer fragment and the functional molecule having an alkoxysilyl group as a structure. As a result, a modified diene rubber polymer having an alkoxysilyl group incorporated therein is obtained.

In detail, in the system containing a polymer fragment, the combining reaction which is a reverse reaction from cleavage proceeds preferentially by changing acido-basic properties of a reaction field. The oxidative cleavage is a reversible reaction, and the cleavage reaction proceeds preferentially than a combining reaction which is a reverse reaction. Therefore, a molecular weight is decreased until reaching equilibrium. In this case, when the acido-basic properties of the reaction field are reversed, the combining reaction proceeds preferentially. As a result, the molecular weight which has been once decreased turns into an increase, and the molecular weight is increased until reaching equilibrium. As a result, a modified diene rubber polymer having a desired molecular weight is obtained. The structure of the above formula (5) has two kinds of tautomerism, and is classified into a structure which combines with the original carbon-carbon double bond, and a structure which forms linking groups represented by the following formulae (1) to (4). In the present embodiment, an aldol condensation reaction has a priority by controlling pH of a reaction field, and a polymer containing at least one linking group of the formulae (1) to (4) can be formed. In detail, in a solution of a reaction system, particularly an aqueous emulsion, pH is controlled for stabilization, and the pH at the time of decomposition shifts to either acidity or basicity depending on a method used in decomposition or a kind or concentration of a chemical. Therefore, in the case where the reaction system at the time of decomposition is acidic, the reaction system is rendered to be basic. On the other hand, in the case where the reaction system at the time of decomposition is basic, the reaction system is rendered to be acidic.

[Chem. 5]

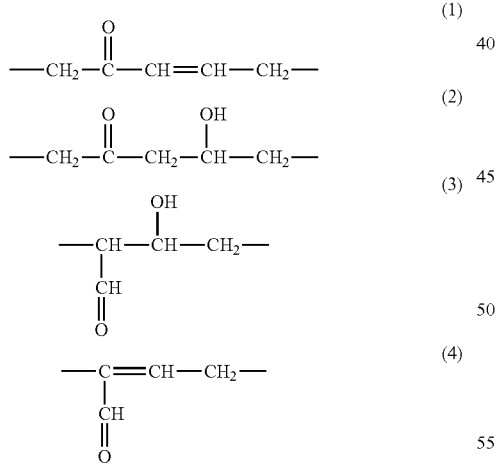

In the case where polymer fragments having a terminal structure in which $R^4$ in the formula (5) is a hydrogen atom are combined with each other a linking group represented by the formula (3) is formed by aldol addition, and a linking group represented by the formula (4) is formed by eliminating water from the linking group of the formula (3). In the case where a polymer fragment having a terminal structure in which $R^4$ is a hydrogen atom is combined with a polymer fragment having a terminal structure in which $R^4$ is a methyl group, an linking group represented by the formula (2) is formed by aldol addition, and a linking group represented by the formula (1) is formed by eliminating water from the linking group of the formula (2). There is a case where a linking group other than the above formulae (1) to (4) is formed, such as the case where polymer fragments having a terminal structure in which $R^4$ is a methyl group are combined with each other. However, the amount of such a linking group is slight, and the linking groups of the formulae (1) to (4) are mainly formed. In more detail, the linking group of the formula (1) is mainly formed.

In the present embodiment, in performing such a dissociative combination reaction of the diene rubber polymer, the functional molecule having an alkoxysilyl group as a structure is contained in the reaction system. By this, a combining reaction between the polymer fragment and the functional molecule proceeds together with recombination of the polymer fragments with each other, and at least one of groups represented by the following formulae (B1) to (B4) is formed. As a result, an alkoxysilyl group is incorporated in a molecular chain of the diene rubber polymer.

[Chem. 6]

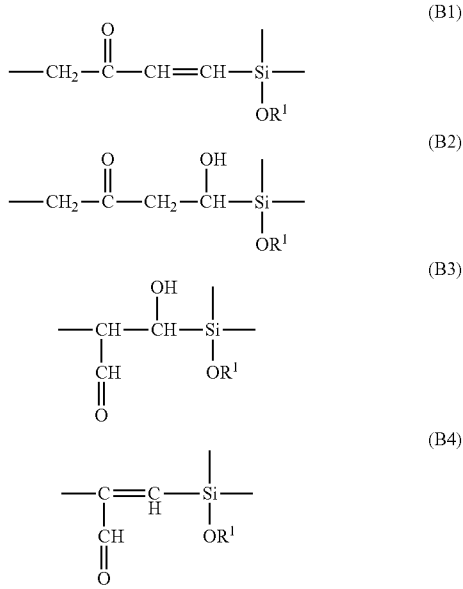

In the formulae (B1) to (B4), $R^1$ represents an alkyl group or an alkoxyalkyl group, having from 1 to 6 carbon atoms, and originated from $R^1$ in the above formula (A). For example, in the case where a polymer having a terminal structure in which $R^4$ in the formula (5) is a hydrogen atom is combined with the functional molecule having an aldehyde group represented by the formula (A), a linking structure represented by the formula (B3) is formed by an aldol condensation reaction, and a linking structure represented by the formula (B4) is formed by eliminating water from the linking structure represented by the formula (B3). In the case where the polymer fragment having a terminal structure in which $R^4$ is a methyl group is combined with the functional molecule having an aldehyde group represented by the formula (A), a linking structure represented by the formula (B2) is formed by an aldol condensation reaction, and a linking group represented by the formula (B1) is formed by eliminating water from the linking structure represented by the formula (B2). Of those, in general the group represented by the formula (B1) is mainly formed. As a result, in one embodiment, the modified diene rubber polymer has at least the group represented by the formula (B1), but may further have at least any one of the groups represented by the formulae (B2) to (B4).

When n in the formula (A) is 1, the linking structures represented by the above formulae (B1) to (B4) are formed at only the molecular terminal. Specifically, terminal groups represented by the following formulae (C1) to (C4) are formed.

[Chem. 7]

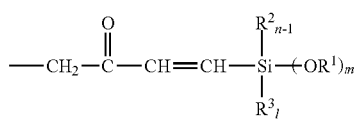
(C1)

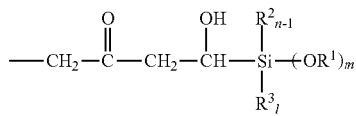
(C2)

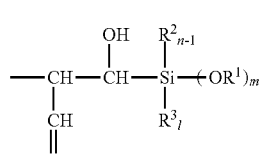
(C3)

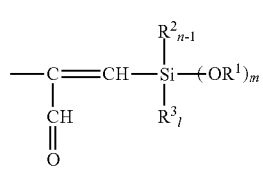
(C4)

In the formulae (C1) to (C4), $R^1$, $R^2$, $R^3$, m, n and l are the same as $R^1$, $R^2$, $R^3$, m, n and l in the formula (A), respectively. Of those, the formula (C1) is mainly formed. As one embodiment, in the case where m is 3, the modified diene rubber polymer contains a structure represented by the following formula (C5). In the formula (C5), $R^1$ is the same as $R^1$ in the formula (A), and a portion indicated by a wavy line is a diene polymer chain.

[Chem. 8]

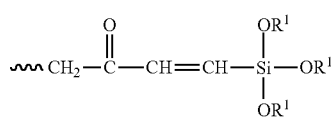
(C5)

When n in the formula (A) is 2, the linking structures represented by the above formulae (B1) to (B4) are mainly formed as linking groups in a main chain. However, the linking structures may be formed at a molecular terminal as in the above formulae (C1) to (C4). Specifically, of the formulae (B1) to (B4), the structure represented by the formula (B1) mainly formed forms a linking group represented by the following formula (F1). Therefore, in this case, the modified diene rubber polymer has a structure in which diene polymer chains are directly linked through the linking group represented by the formula (F1). In the formula (F1), $R^1$ and $R^3$ are the same as $R^1$ and $R^3$ in the formula (A), respectively, and p is a number of 1 or 2.

[Chem. 9]

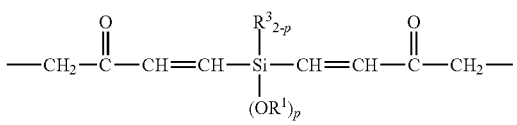
(F1)

When n in the formula (A) is 3, the linking structures represented by the above formulae (B1) to (B4) are mainly formed as a crosslinking point in a main chain. However, the linking structures may be formed at a molecular terminal as in the above formulae (C1) to (C4). Of the formulae (B1) to (B4), the structure represented by the formula (B1) mainly formed specifically forms a branched linking group represented by the following formula (G1). Therefore, in this case, the modified diene rubber polymer has a structure in which a diene polymer chain is directly linked to three sides with the linking group represented by the formula (G1) as the center. In the formula (G1), $R^1$ is the same as $R^1$ in the formula (A).

[Chem. 10]

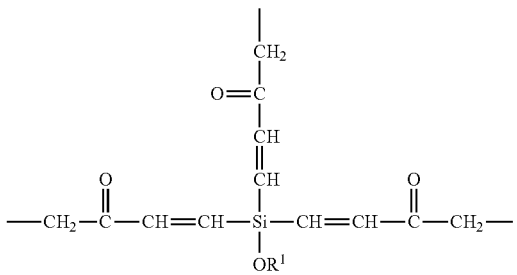
(G1)

The pH of the reaction system in performing a combining reaction is larger than 7, preferably from 7.5 to 13, and more preferably from 8 to 10, in the case where the reaction system is rendered to be basic. On the other hand, in the case where the reaction system is rendered to be acidic, the pH is smaller than 7, preferably from 4 to 6.8, and more preferably from 5 to 6. The pH can be adjusted by adding an acid or a base to the reaction system. Although not particularly limited, examples of the acid include hydrochloric acid, sulfuric acid, nitric acid and phosphoric acid, and examples of the base include sodium hydroxide, potassium hydroxide, sodium carbonate and sodium hydrogen carbonate.

In performing the combining reaction, the acid or base used for adjusting pH functions as a catalyst of the combining reaction, and for example, pyrrolidine-2-carboxylic acid can be further used as a catalyst for adjusting the reaction.

In the present embodiment, a silane monomer is added to a system containing the modified diene rubber polymer obtained by the combining reaction, followed by condensation polymerization, thereby forming silica. That is, in the present embodiment, since an alkoxysilyl group (Si—OR$^1$) is incorporated in a molecular chain of the diene rubber polymer, the silane monomer is subjected to an intramolecular condensation reaction (that is, in-situ condensation polymerization in a rubber polymer) using the alkoxysilyl group. By this, silica particles are formed in the state of bonding to a molecular chain of the rubber polymer.

Tetraalkoxysilane, alkyltrialkoxysilane or the combination of those can be used as the silane monomer. Thus, use of the silane monomer having three or more alkoxy groups bonded to a silicon atom makes it possible to have three-dimensional connection due to a polycondensation reaction. The number of carbon atom in the alkoxy group or alkyl group bonded to a silicon atom is preferably 4 or less, respectively. Therefore, preferred examples of the alkoxy group include a methoxy group, an ethoxy group, a propoxy group and a butoxy group, and preferred examples of the alkyl group include a methyl group, an ethyl group, a propyl group and a butyl group. The silane monomer is preferably tetraethoxysilane (TEOS, Si(OC$_2$H$_5$)$_4$) and tetramethoxysilane (TMOS, Si(OCH$_3$)$_4$) from the standpoint of reactivity and cost.

The in-situ condensation polymerization can be conducted by adding a catalyst together with the silane monomer to an aqueous solvent (aqueous emulsion) containing the modified diene rubber polymer after the combining reaction. A acidic catalyst such as hydrochloric acid, and a basic catalyst such as ammonia or ethylenediamine are used as the catalyst, and a basic catalyst such as ammonia is particularly preferred. After adding and mixing the silane monomer and the catalyst, the resulting mixture is heated while stirring, thereby an alkoxysilane can be subjected to hydrolysis and polycondensation, and silica particles can be formed.

For example, in the case of the modified diene rubber polymer having a terminal structure represented by the following formula (C6) (in the formula, Et indicates an ethoxy group), a condensation reaction occurs between an alkoxysilyl group (Si-OEt) at its terminal and tetraethoxysilane, and a siloxane bond is formed. Furthermore, tetraethoxysilanes are gradually condensed with each other, and a three-dimensional connection of silica (SiO$_2$) is formed. By this, silica is formed in the state that silica is bonded to a silicon atom of the modified diene rubber polymer through a siloxane bond (—O—Si).

[Chem. 11]

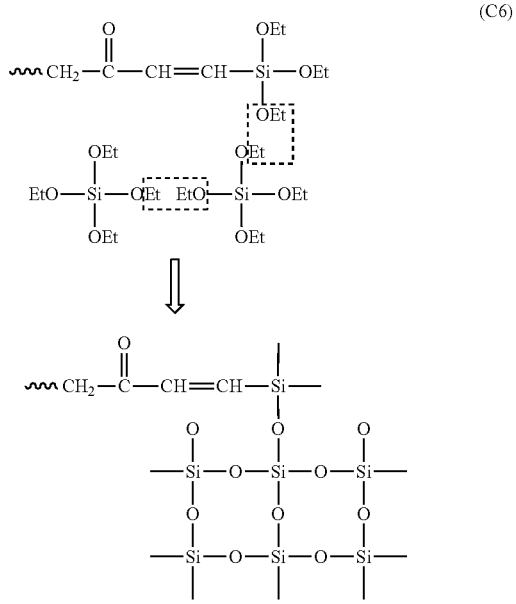

(C6)

As described above, after forming silica by the in-situ condensation polymerization, the modified diene rubber polymer is coagulated together with silica, followed by dehydrating and drying. Thus, a rubber-silica composite is obtained.

According to the present embodiment, by subjecting the diene rubber polymer to dissociative combination, the linking groups represented by the above formulae (1) to (4) are incorporated in a main chain, and a modified polymer in which the structure has been changed is obtained. That is, the modified diene rubber polymer according to the present embodiment has at least one linking group of the linking groups represented by the above formulae (1) to (4) in the molecule, and may have a structure in which diene polymer chains are directly linked through the linking group. Therefore, when any of the linking groups represented by the formulae (1) to (4) is X and a diene polymer chain is Y, the modified diene rubber polymer according to one embodiment contains a structure represented by —Y—X—Y— in the molecule.

In the present embodiment, a functional molecule having an alkoxysilyl group is concurrently used at the time of the combining reaction. Therefore, the modified diene rubber polymer has at least one of the groups represented by the above formulae (B1) to (B4) in the molecule. The groups represented by the formulae (B1) to (B4) are formed at a molecular terminal or in a molecular chain of the modified diene rubber polymer as described above, and constitute a linking group linking the diene polymer chains, similar to the formulae (1) to (4) when formed in a molecular chain.

In the present embodiment, by the in-situ condensation polymerization, silica particles are formed at an alkoxysilyl group incorporated in the modified diene rubber polymer as a starting point. Therefore, the modified diene rubber polymer in the rubber-silica composite has at least one of groups represented by the following formulae (D1) to (D4) in the molecule, and becomes the state in which silica is bonded to a silicon atom in the formula through a siloxane bond (that is, Si—O—(SiO$_2$)$_k$, wherein k is a number of 1 or more).

The formulae (D1) to (D4) correspond to the formulae (B1) to (B4), respectively, and as a result, a group represented by the formula (D1) is mainly formed. Therefore, in one embodiment, the modified diene rubber polymer has at least the group represented by the formula (D1), but may further have at least one of the groups represented by the formulae (D2) to (D4). Regarding the linking moiety other than Si—O—, silica may be similarly linked through a siloxane bond, an alkyl group represented by $R^3$ above may be linked, and a diene polymer chain may be linked through a linking structure by aldol condensation.

[Chem. 12]

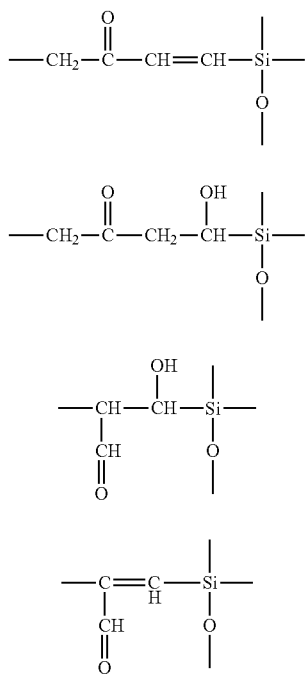

In more detail, when n in the formula (A) is 1, the modified diene rubber polymer in the rubber-silica composite has at least one of groups represented by the following formulae (E1) to (E4) in the molecular terminal, and becomes the state in which silica is bonded to a silicon atom of the molecular terminal through a siloxane bond. Of those groups, the group represented by the formula (E1) is mainly contained.

[Chem. 13]

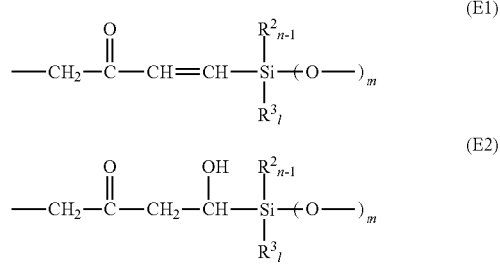

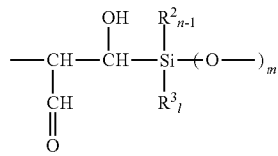

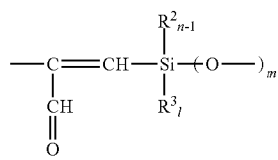

In the formulae (E1) to (E4), $R^2$, $R^3$, m, n and l are the same as $R^2$, $R^3$, m, n and l in the formula (A), respectively.

When n in the formula (A) is 2, in addition to the above formulae (E1) to (E4), the structures represented by the formulae (D1) to (D4) are formed as linking groups in a main chain, and a group corresponding to the above formula (F1) is mainly formed as a linking group. Therefore, in this case, the modified diene rubber polymer in the rubber-silica composite contains a structure in which Si—$(OR_1)_p$ in the formula (F1) is Si—$(O—)_p$. When n in the formula (A) is 3, in addition to the structures as the above formulae (E1) to (E4) and the above linking groups, the structures represented by the formulae (D1) to (D4) are formed as crosslinking points in a main chain, and the group corresponding to the above formula (G1) is mainly formed as a crosslinking point. Therefore, in this case, the modified diene rubber polymer in the rubber-silica composite contains a structure in which Si—$OR^1$ in the formula (G1) is Si—O—.

The diene polymer chain used herein is a molecular chain which is a part of a molecular chain of the diene rubber polymer to be modified. For example, in the case of a homopolymer of a conjugated diene compound, when a constituent unit comprising the conjugated diene compound is $A^1$, the diene polymer chain has a repeating structure of $A^1$ represented by -$(A^1)_n$- (n is an integer of 1 or more, preferably from 10 to 10,000, and more preferably from 50 to 1,000). In the case of a binary copolymer, when each constituent unit is $A^1$ and $A^2$ (at least one of $A^1$ and $A^2$ is a unit comprising a conjugated diene compound, and other unit includes a unit comprising a vinyl compound such as styrene), the diene polymer chain has a repeating structure of $A^1$ and $A^2$ represented by -$(A^1)_n$-$(A^2)_m$- (Those are a random type or a block type. n and m each are an integer of 1 or more, preferably from 10 to 10,000, and more preferably from 50 to 1,000). In the case of a ternary polymer, when each constituent m unit is $A^1$, $A^2$ and $A^3$ (at least one of $A^1$, $A^2$ and $A^3$ is a unit comprising a conjugated diene compound, and other unit includes a unit comprising the vinyl compound), the diene polymer chain has a repeating structure of $A^1$, $A^2$ and $A^3$ represented by -$(A^1)_n$-$(A^2)_m$-$(A^3)_p$- (Those may be a random type or a block type. n, m and p each are an integer of 1 or more, preferably from 10 to 10,000, and more preferably from 50 to 1,000). Quaternary or more copolymers are the same.

More specifically, for example, in the case of using natural rubber or a synthetic isoprene rubber as a rubber to be modified, the diene polymer chain is a polyisoprene chain represented by the following formula (8), comprising a repeating structure of an isoprene unit. In the case of using a styrene-butadiene rubber to be modified, the diene polymer chain is a styrene-butadiene random copolymer chain represented by the following formula (9). In the case of using a butadiene rubber to be modified, the diene polymer chain is a polybutadiene chain represented by the following formula (10). In those formulae, n and m are each independently are an integer of 1 or more, preferably from 10 to 10,000, and more preferably from 50 to 1,000.

[Chem. 14]

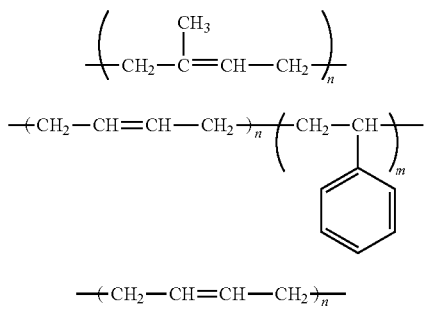

(8)

(9)

(10)

In the modified diene rubber polymer according to one embodiment, at least one of the linking groups of the formulae (1) to (4) is contained in one molecule, and a plurality of linking groups is generally contained in one molecule. In the case of containing a plurality of the linking groups, a plurality of any one kind of the linking groups represented by the formulae (1) to (4) may be contained, and two or more kinds of the linking groups may be contained. The content of the linking groups is not particularly limited. The total content of the linking groups of the formulae (1) to (4) is preferably from 0.001 to 25 mol %, more preferably from 0.1 to 15 mol %, and still more preferably from 0.5 to 10 mol %. The content of the linking groups is a ratio of mole number of linking groups to mole number of the whole constituent units constituting the modified diene rubber polymer. For example, in the case of natural rubber, the content is a ratio of mole number of linking groups to the total of mole numbers of whole isoprene units, the linking groups and the groups represented by the formulae (D1) to (D4) in the modified polymer.

The content of each of the linking groups represented by the formulae (1) to (4) is not particularly limited, but is preferably 25 mol % or less (that is, from 0 to 25 mol %), respectively. For example, in the case of using natural rubber or synthetic isoprene rubber as a rubber to be modified, all of the linking groups represented by the formulae (1) to (4) is generally formed, but the linking group comprising α,β-unsaturated carbonyl group represented by the formula (1) is mainly contained. In this case, the content of the linking group represented by the formula (1) is preferably from 0.001 to 20 mol %, more preferably from 0.05 to 10 mol %, and still more preferably from 0.5 to 5 mol %.

In the modified diene rubber polymer according to the present embodiment, at, least one of the groups of the formulae (D1) to (D4) is contained in one molecule. In the case of containing a plurality of the groups, a plurality of any one kind of the groups represented by the formulae (D1) to (D4) may be contained, and two or more kinds of the groups may be contained. The content of those groups (that is, the proportion of silyl groups incorporated) is not particularly limited. The total content of the groups represented by the formulae (D1) to (D4) is preferably from 0.01 to 10 mol %, more preferably from 0.05 to 5 mol %, and still more preferably from 0.1 to 3.5 mol %. The content of each of the groups represented by the formulae (D1) to (D4) is not particularly limited, but is preferably 10 mol % or less, respectively. The content of the group represented by the formula (D1) as a main component is preferably from 0.01 to 10 mol %, more preferably from 0.05 to 5 mol %, and still more preferably from 0.1 to 3.5 mol %. The content of the groups represented by the formulae (D1) to (D4) is a ratio of mole number of the goups represented by the formulae (D1) to (D4) to mole number of the whole constituent units constituting the modified diene rubber polymer. The content of the groups represented by the formulae (D1) to (D4) is equal to the content of the groups represented by the formulae (B1) to (B4).

In the rubber-silica composite according to the present embodiment, the content of silica formed by condensation polymerization of a silane monomer is not particularly limited, but is preferably from 1 to 50 parts by mass, more preferably from 2 to 25 parts by mass, and still more preferably from 5 to 15 parts by mass, per 100 parts by mass of the modified diene rubber polymer.

The modified diene rubber polymer according to the embodiment is preferably in a solid state at the ordinary temperature (23° C.). For this reason, the number average molecular weight of the modified diene rubber polymer is preferably 60,000 or more, more preferably from 60,000 to 1,000,000, still more preferably from 80,000 to 800,000, and still further preferably from 100,000 to 600,000. The molecular weight of the modified diene rubber polymer is preferably set to a molecular weight equivalent to the molecular weight of the original polymer by performing recombination as described above. This enables a functional group to incorporate in a main chain or terminal of a polymer without decreasing the molecular weight and therefore while avoiding adverse influence to properties. Of course, the modified diene rubber polymer having a molecular weight smaller than that of the original polymer may be obtained. The weight average molecular weight of the modified diene rubber polymer is not particularly limited, but is preferably 70,000 or more, and more preferably from 100,000 to 1,800,000.

According to the present embodiment, as described above, the polymer is decomposed by subjecting a double bond in a main chain to oxidative cleavage to once decrease its molecular weight, and acido-basic properties of a reaction system are then changed to perform recombination, thereby the modified diene rubber polymer is formed. As a result, the modified diene rubber polymer can be converged into more uniform structure by monodispersion of the polymer. That is, the molecular weight distribution of the modified diene rubber polymer can be smaller than the molecular weight distribution of the original polymer. This is considered that since the polymer fragment decomposed by oxidative cleavage has high reactivity and is easily to recombine as the polymer fragment becomes short, the molecular weight is uniformed by decreasing short polymers.

According to the present embodiment, the reaction for performing oxidative cleavage is controlled by adjusting a kind and amount of an oxidizing agent which is an agent for dissociating a double bond, a reaction time, and the like, and a combining reaction can be controlled by adjusting pH, a catalyst, a reaction time and the like in performing a recombination. The molecular weight of the modified diene rubber polymer can be controlled by controlling those.

Therefore, the number average molecular weight of the modified diene rubber polymer can be set equal to that of the original polymer, and can be set to smaller than that of the original polymer.

In decomposing and recombining a polymer main chain, the above-described linking group is incorporated as a structure different from the main chain, and a connection point of segments in a main chain structure is functionized. That is, a structure having high reactivity is incorporated in a molecular main chain, and characteristics of the original polymer can be changed. Thus, the method of the present embodiment is to change a main chain structure itself of a polymer, which is not grafting, direct addition and ring-opening and apparently different from the conventional modification method, and a functional group can be simply incorporated in a main chain structure.

In performing dissociative combination of the diene rubber polymer, by containing a functional molecule having the alkoxysilyl group as a structure, an alkoxysilyl group can be easily incorporated in a terminal or molecular chain of a diene rubber polymer. Silica particles having an alkoxysilyl group as an origin can be formed by performing condensation polymerization of a silane monomer to the modified diene rubber polymer having the alkoxysilyl group incorporated therein. That is, silica is formed in the state of bonding to a molecular chain of the diene rubber polymer, and as a result, dispersibility of silica to the diene rubber polymer can be improved.

The rubber-silica composite according to the present embodiment can be used in various rubber compositions. That is, the rubber composition according to the embodiment contains the rubber-silica composite. The rubber composition comprises the modified diene rubber polymer in the rubber-silica composite as a rubber component, and the silica in the composite as a filler component, and can be prepared by adding other additives to the composite.

The rubber component added to the rubber composition may be the modified diene rubber polymer alone added as a rubber-silica composite, and may be a blend with other rubber. The other rubber is not particularly limited, and examples of the other rubber include various diene rubbers such as natural rubber (NR), synthetic isoprene rubber (IR), butadiene rubber (BR), styrene-butadiene rubber (SBR), nitrile rubber (NBR), butyl rubber (IIR) and halogenated butyl rubber. Those can be used alone or as mixtures of two or more kinds thereof. The content of the modified diene rubber occupied in the rubber component is not particularly limited, but is preferably 30 parts by mass or more, more preferably 50 parts by mass or more, and still more preferably 70 parts by mass or more, per 100 parts by mass of the rubber component.

The rubber composition may contain other filler, in addition to silica added as the rubber-silica composite. Examples of the other filler that can be used include various inorganic fillers such a silica, carbon black, titanium oxide, aluminum silicate, clay and talc. Those can be used alone or as mixtures of two or more kinds thereof. Of those, silica and/or carbon black are preferably used.

The silica additionally added is not particularly limited, and includes wet silica (hydrous silicic acid) and dry silica (anhydrous silicic acid). Of those, wet silica is preferred. Colloidal characteristics of the silica are not particularly limited. Silica having nitrogen adsorption specific surface area (BET) by BET method of from 150 to 250 m$^2$/g is preferably used. Silica having BET of from 180 to 230 m$^2$/g is more preferably used. The BET of silica is measured according to BET method described in ISO 5794.

Carbon black is not particularly limited. Various grades of furnace carbon black, such as SAF, ISAF, HAF and FEF that are used as a reinforcing agent for a rubber, can be used.

The total amount of the fillers contained in the rubber composition (including a filler added as a rubber-silica composite) is not particularly limited. The total amount is preferably from 5 to 150 parts by mass, preferably from 15 to 120 parts by mass, and still more preferably from 20 to 100 parts by mass, per 100 parts by mass of the rubber component.

A silane coupling agent such as sulfide silane or a mercaptosilane may be added to the rubber composition according to the present embodiment. The amount of the silane coupling agent added is not particularly limited. The amount is preferably from 2 to 20 mass % based on the total amount of silica contained in the rubber composition.

Other than the above-described components, various additives such as an oil, zinc flower, stearic acid, an age resister, a wax, a vulcanizing agent and a vulcanization accelerator that are generally used in a rubber composition can be added to the rubber composition according to the present embodiment. Examples of the vulcanizing agent include sulfur and a sulfur-containing compound (for example, sulfur chloride, sulfur dichloride, high molecular polysulfide, morpholine disulfide and alkyl phenol disulfide). Those are used in any one kind alone or as mixtures of two or more kinds thereof. The amount of the vulcanizing agent added is not particularly limited. The amount is preferably from 0.1 to 10 parts by mass, and more preferably from 0.5 to 5 parts by mass, per 100 parts by mass of the rubber component. Examples of the vulcanization accelerator that can be used include various vulcanization accelerators of sulfenamide type, thiuram type, thiazole type or guanidine type. Those can be used in any one kind alone or as mixtures of two or more kinds thereof. The amount of the vulcanization accelerator is not particularly limited. The amount is preferably from 0.1 to 7 parts by mass, and more preferably from 0.5 to 5 parts by mass, per 100 parts by mass of the rubber component.

The rubber composition according to the present embodiment can be prepared by kneading according to the conventional methods using a mixing machine such as Banbury mixer, a kneader or rolls, that are generally used. That is, in a first mixing stage, other additives excluding a vulcanizing agent and a vulcanization accelerator, together with an additional rubber component and an additional filler as optional components, are added to and mixed with the rubber-silica composite, and in a final mixing stage, a vulcanizing agent and a vulcanization accelerator are added to and mixed with the mixture obtained. Thus, a rubber composition can be prepared.

The intended use of the rubber composition thus obtained is not particularly limited, and the rubber composition can be used in various rubber members for use in a tire, an anti-vibration rubber, a conveyer belt and the like. The preferred use embodiment is a rubber composition for a tire. That is, the rubber composition can be applied to each site of a tire, such as a tread part, a side wall part, a bead part and a rubber for covering a tire cord, of a pneumatic tire having various sizes and to be used in various uses, for example, for passenger cars or for a large-sized tire of trucks and buses. The rubber composition can produce a pneumatic tire by, for example, forming into a predetermined shape by extrusion processing, combining with other parts, and then vulcanization molding at a temperature of, for example, from 140 to 180° C., according to the conventional method. Of those, the rubber composition is particularly preferably used as formulation for a tread of a tire. When the rubber composition according to the present embodiment is used, dispersibility of silica can be improved, and as a result, rolling resistance of a tire can be reduced and low fuel consumption performance can be improved.

EXAMPLES

Examples of the present invention are described below, but it should be understood that the invention is not construed as being limited to those examples. Measurement method and the like used in the following examples and comparative examples are as follows.

[Number Average Molecular Weight (Mn), Weight Average Molecular Weight (Mw) and Molecular Weight Distribution (Mw/Mn)]

Mn, Mw and Mw/Mn in terms of polystyrene were obtained by the measurement with gel permeation chromatography (GPC). In detail, 0.2 mg of a sample was dissolved in 1 mL of THF, and was used as a measurement sample. Using "LC-20DA" manufactured by Shimadzu Corporation, the sample was passed through a filter and then passed through a column ("PL Gel 3 μm Guard×2" manufactured by Polymer Laboratories) at a temperature of 40° C. in a flow rate of 0.7 m/min, followed by detection with "RI Detector" manufactured by Spectra System.

[pH]

pH was measured using a portable pH meter "HM-30P Series" manufactured by DKK-TOA Corporation.

[Content of Functional Group]

Content of the linking groups of the formulae (1) to (4) was measured by NMR. NMR spectrum was measured using TMS as a standard by "400 ULTRASHIELD™ PLUS" manufactured by BRUKER. 1 g of a polymer was dissolved in 5 mL of deuteriochloroform, 87 mg of acetylacetone chromium salt was added as a relaxation agent, and measurement was conducted in NMR 10 mm tube.

Regarding the linking group of the formula (1), a peak of carbon having a ketone group attached thereto is present at 195 ppm in $^{13}C$—NMR. Regarding the linking group of the formula (2), a peak of carbon having a ketone group attached thereto is present at 205 ppm in $^{13}C$—NMR. Regarding the linking group of the formula (3), a peak of carbon having a ketone group attached thereto is present at 200 ppm in $^{13}C$—NMR. Regarding the linking group of the formula (4), a peak of carbon having a ketone group attached thereto is present at 185 ppm in $^{13}C$—NMR. Therefore, the amount (mole number) of structure was determined by a ratio of each peak of those peaks to a base polymer component. Regarding the formula (3), in the case where a terminal ketone (the structure of the formula (5)) appears, it overlaps the peak of carbon (200 ppm). Therefore, the amount of terminal ketone was quantitatively determined by the following method, and removed. That is, the peak of proton attached to a ketone group appears at 9.0 ppm by $^1H$—NMR. Therefore, a residual amount was determined by a ratio to a base polymer component.

Regarding mole number of each unit in a base polymer component, the mole number of an isoprene unit was calculated based on peaks of carbon on the opposite side of a double bond from a methyl group and hydrogen bonded to the carbon (=CH—), that is, 122 ppm by $^{13}C$—NMR and 5.2 ppm by $^1H$—NMR.

Regarding the content of a silyl group, the content of the groups represented by the formulae (B1) to (B4) was measured. Regarding the linking structure of the formula (B1), the peak of carbon neighboring silicon is present at 129 ppm in $^{13}C$—NMR. Regarding the linking structure of the formula (B2), the peak of carbon neighboring silicon is present at 56 ppm in $^{13}C$—NMR. Regarding the linking structure of the formula (B3), the peak of carbon neighboring silicon is present at 204 ppm in $^{13}C$—NMR. Regarding the linking structure of the formula (B4), the peak of carbon neighboring silicon is present at 132 ppm in $^{13}C$—NMR. Therefore, regarding each of those peaks, the content (mol %) of each structure was determined by a ratio to a base polymer component. In the case of bifunction of n=2 as above and in the case of trifunction of n=3, NMR peak area of two times or three times appears. Therefore, the value obtained by dividing by 2 or 3 is used as the content of a silyl group in each structure.

[Silica Content]

Amount of a residual ash component was measured by "Thermogravimetric Analyzer TGA-DSC 1" manufactured by Mettler Toledo AG, and the amount of silica in a rubber-silica composite (that is, parts by mass of silica per 100 parts by mass of modified diene rubber polymer) was measured as the amount of residual ash component being the content of silica.

Comparative Example 1

Synthesis of Modified Polymer A

Natural rubber latex ("HA-NR" manufactured by Regitex Co., Ltd., DRC (Dry Rubber Content)=60 mass %) was used as the polymer to be modified. Molecular weight of unmodified natural rubber contained in the natural rubber latex was measured. As a result, a weight average molecular weight was 2,020,000, a number average molecular weight was 510,000, and a molecular weight distribution was 4.0.

2.0 g of periodic acid ($H_5IO_6$) was added to 100 g of the mass of a polymer in the natural rubber latex having DRC adjusted to 30 mass %, followed by stirring at 23° C. for 3 hours. Thus, by adding periodic acid to a polymer in an emulsion state, followed by stirring, a double bond in the polymer chain was oxidatively decomposed, and a polymer fragment containing the structure represented by the formula (5) was obtained. The polymer after the decomposition had a weight average molecular weight of 10,400, a number average molecular weight of 3,800, and a molecular weight distribution of 2.7. Furthermore, pH of a reaction liquid after the decomposition was 5.1.

Thereafter, 0.1 g of pyrrolidine-2-carboxylic acid was added as a catalyst, and 1N sodium hydroxide was added such that pH of the reaction liquid becomes 8, followed by stirring at 23° C. for 18 hours to conduct the reaction. Solid content was precipitated in methanol, washed with water, and dried at 30° C. for 24 hours by a hot air circulation type drier. Thus, modified polymer A in a solid state at the ordinary temperature was obtained.

Thus, by adding sodium hydroxide to the oxidatively decomposed reaction system and forcedly changing the reaction system to basicity from acidity, the recombination reaction could be preferential while neutralizing the effect of periodic acid added in conducting the oxidative cleavage. As a result, modified natural rubber (modified polymer A) containing the linking groups represented by the formulae (1) to (4) in the molecule was obtained. Pyrrolidine-2-carboxylic acid was used as a catalyst, but is a material for accelerating a reaction, and the reaction proceeds without pyrrolidine-2-carboxylic acid.

The modified polymer A was that as shown in Table 1 below, a weight average molecular weight Mw is 1,590,000, a number average molecular weight Mn is 250,000, a molecular weight distribution Mw/Mn is 6.4, the content of the linking group is 1.2 mol % for the formula (1), 0.3 mol % for the formula (2), 0.2 mol % for the formula (3) and 0.5 mol % for the formula (4), and the total content is 2.2 mol %.

Comparative Example 2

Synthesis of Modified Polymer B

After performing oxidative cleavage of natural rubber in Comparative Example 1, 15 g of trivinylethoxysilane was added to the reaction liquid obtained, followed by stirring at 23° C. for 3 hours, to oxidatively decompose a double bond of a vinyl group of trivinylethoxysilane. pH of the reaction liquid after the decomposition was 5.1. Thereafter, 0.1 g of pyrrolidine-2-carboxylic acid was added as a catalyst, and 1N sodium hydroxide was added such that pH of the reaction liquid becomes 8, followed by stirring at 23° C. for 18 hours to conduct the recombination reaction. Solid content was precipitated in methanol, washed with water, and dried at 30° C. for 24 hours by a hot air circulation type drier. Thus, modified polymer B in a solid state at the ordinary temperature was obtained.

The modified polymer B was that as shown in Table 1 below, a weight average molecular weight Mw is 1,630,000, a number average molecular weight Mn is 260,000, a molecular weight distribution Mw/Mn is 6.3, and the content of the linking group is 1.2 mol % for the formula (1), 0.1 mol % for the formula (2), 0.1 mol % for the formula (3) and 0.1 mol % for the formula (4). Furthermore, the group represented by the formula (B1) (in detail, mainly the formula (G1)) was mainly contained as a silyl group, and the content of the silyl group was 3.1 mol % for the formula (B1), 0.03 mol % for the formula (B2), 0.03 mol % for the formula (B3) and 0.07 mol % for the formula (B4).

Example 1

Synthesis of Rubber-Silica Composite a

After conducting the recombination reaction in Comparative Example 2, a silane monomer was added to conduct in-situ condensation polymerization. That is, in Comparative Example 2, 1N sodium hydroxide was added such that pH of the reaction liquid becomes 8, followed by stirring at 23° C. for 18 hours to conduct the reaction. Thereafter, the latex obtained was neutralized with formic acid (diluted to a concentration of 10% with water). Only a polymer solid content was taken out by a centrifugal separator. 50 g of the solid content was redispersed in an aqueous solution obtained by previously dissolving 1.0 g of sodium laurylsulfate in 100 g of water, and 10 g of tetraethoxysilane and 10 ml of a 28% ammonium aqueous solution were added, followed by stirring for 3 hours to conduct the reaction. Thereafter, the resulting mixture was separated into the polymer solid content (including silica bonded to the polymer) and other component (including silica formed alone without bonding to the polymer) by the difference of gravity using a centrifugal separator. The polymer solid content obtained was redispersed in an aqueous solution obtained by previously dissolving 1.0 g of sodium laurylsulfate in 100 g of water, precipitated in methanol, washed with water, and dried at 30° C. for 24 hours by a hot air circulation drier. Thus, rubber-silica composite a was obtained.

The centrifugal separation was conducted under the conditions of 8,000 rpm and 30 minutes using a centrifugal separator "KUBOTA 6800" and a rotor "RA800", manufactured by Kubota Manufacturing Co., Ltd. By conducting the centrifugal separation, silica which is not bonded to a polymer is separated from the polymer, and as a result, a rubber-silica composite containing only silica bonded to the polymer is obtained.

The rubber-silica composite a obtained was that the modified diene rubber polymer is the same as the modified polymer B in Comparative Example 2, and had silica bonded to silicon atom of the alkoxysilyl group through a siloxane bond. The amount of silica was 2.5 parts by mass per 100 parts by mass of the modified diene rubber polymer as shown in Table 1.

Examples 2 and 3

Synthesis of Rubber-Silica Composites b and c

Rubber-silica composites b and c were obtained in the same manner as in Example 1, except that in the in-situ condensation polymerization after the recombination reaction, the process of centrifugal separation, redispersion and reaction was conducted two times in Example 2 and three times in Example 3. The amounts of silica in the rubber-silica composites b and c obtained were 5.8 parts by mass and 11.2 parts by mass, per 100 parts by mass of the modified diene rubber polymer, respectively, as shown in Table 1.

Comparative Example 3

Synthesis of Modified Polymer C

After performing the oxidative cleavage of natural rubber in Comparative Example 1, 10 g of vinyl triethoxysilane was added to the reaction liquid obtained, followed by stirring at 23° C. for 3 hours to oxidatively decompose a double bond of a vinyl group of the vinyl triethoxysilane. pH of the reaction liquid after the decomposition was 4.8. Thereafter, 0.1 g of pyrolidine-2-carboxylic acid was added as a catalyst, and 1N sodium hydroxide was added such that pH of the reaction liquid becomes 8, followed by stirring at 23° C. for 18 hours to conduct the recombination reaction. Solid content was precipitated in methanol, washed with water, and dried at 30° C. for 24 hours by a hot air circulation type drier. Thus, modified polymer C in a solid state at the ordinary temperature was obtained.

The modified polymer C was that as shown in Table 1 below, a weight average molecular weight Mw is 1,410,000, a number average molecular weight Mn is 190,000, a molecular weight distribution Mw/Mn is 7.4, and the content of the linking group is 1.0 mol % for the formula (1), 0.1 mol % for the formula (2), 0.2 mol % for the formula (3) and 0.2 mol % for the formula (4). Furthermore, the group represented by the formula (B1) (in detail, $R^1$=ethyl group in the formula (C5)) was mainly contained as a silyl group, and the content of the silyl group was 0.4 mol % for the formula (B1), 0.0 mol % for the formula (B2), 0.0 mol % for the formula (B3) and 0.1 mol % for the formula (B4).

Example 4

Synthesis of Rubber-Silica Composite d

After conducting the recombination reaction in Comparative Example 3, a silane monomer was added to conduct in-situ condensation polymerization. That is, in Comparative Example 3, 1N sodium hydroxide was added such that pH of the reaction liquid becomes 8, followed by stirring at 23° C. for 18 hours to conduct the reaction. Thereafter, the latex obtained was neutralized with formic acid (diluted to a concentration of 10% with water), and the same centrifugal separation, redispersion and reaction using tetraethoxysilane as in Example 1 were then conducted three times. Similar to Example 1, a polymer solid content containing silica bonded to the polymer was taken out by centrifugal separation, and after the redispersion, the polymer solid content was precipitated in methanol, washed, and dried. Thus, rubber-silica composite d was obtained.

The rubber-silica composite d obtained was that the modified diene rubber polymer is the same as the modified polymer C in Comparative Example 3, and had silica bonded to silicon atom of the alkoxysilyl group through a siloxane bond. The amount of silica was 5.2 parts by mass per 100 parts by mass of the modified diene rubber polymer as shown in Table 1.

TABLE 1 a

| | Before oxidative decomposition | | | Oxidative decomposition condition Amount of periodic acid (g) | After decomposition | | | | Functional molecule and its amount | Recombination condition | | |
|---|---|---|---|---|---|---|---|---|---|---|---|---|
| | $Mw$ $(\times 10^5)$ | $Mn$ $(\times 10^5)$ | Mw/Mn | | $Mw$ $(\times 10^3)$ | $Mn$ $(\times 10^3)$ | Mw/Mn | pH | | Amount of Pyrrolidine-2-carboxylic acid (g) | pH regulator | pH |
| Comparative Example 1: Modified polymer A | 20.2 | 5.1 | 4.0 | 2.0 | 10.4 | 3.8 | 2.7 | 5.1 | None | 0.1 | NaOH | 8.0 |
| Comparative Example 2: Modified polymer B | 20.2 | 5.1 | 4.0 | 2.0 | 10.4 | 3.8 | 2.7 | 5.1 | Trivinyl-ethoxy-silane 15 g | 0.1 | NaOH | 8.0 |
| Example 1: Rubber-silica composite a | 20.2 | 5.1 | 4.0 | 2.0 | 10.4 | 3.8 | 2.7 | 5.1 | Trivinyl-ethoxy-silane 15 g | 0.1 | NaOH | 8.0 |
| Example 2: Rubber-silica composite b | 20.2 | 5.1 | 4.0 | 2.0 | 10.4 | 3.8 | 2.7 | 5.1 | Trivinyl-ethoxy-silane 15 g | 0.1 | NaOH | 8.0 |
| Example 3: Rubber-silica composite c | 20.2 | 5.1 | 4.0 | 2.0 | 10.4 | 3.8 | 2.7 | 5.1 | Trivinyl-ethoxy-silane 15 g | 0.1 | NaOH | 8.0 |
| Comparative Example 3: Modified polymer C | 20.2 | 5.1 | 4.0 | 2.3 | 9.2 | 2.4 | 2.4 | 4.8 | Trivinyl-ethoxy-silane 10 g | 0.1 | NaOH | 8.0 |
| Example 4: Rubber-silica composite d | 20.2 | 5.1 | 4.0 | 2.3 | 9.2 | 2.4 | 2.4 | 4.8 | Trivinyl-ethoxy-silane 10 g | 0.1 | NaOH | 8.0 | b

| | After recombination reaction | | | TEOS amount (g) | Content of functional group (mol %) | | | | | | | | | | |
|---|---|---|---|---|---|---|---|---|---|---|---|---|---|---|---|
| | | | | | Linking group content | | | | | Silyl group content | | | | | Silica content (parts by mass) |
| | $Mw$ $(\times 10^5)$ | $Mn$ $(\times 10^5)$ | Mw/Mn | | Formula (1) | Formula (2) | Formula (3) | Formula (4) | Total | Formula (B1) | Formula (B2) | Formula (B3) | Formula (B4) | Total | |
| Comparative Example 1: Modified polymer A | 15.9 | 2.5 | 6.4 | 0 | 1.2 | 0.3 | 0.2 | 0.5 | 2.2 | 0.0 | 0.0 | 0.0 | 0.0 | 0.0 | 0 |
| Comparative Example 2: Modified polymer B | 16.3 | 2.6 | 6.3 | 0 | 1.2 | 0.1 | 0.1 | 0.1 | 1.5 | 3.1 | 0.03 | 0.03 | 0.07 | 3.2 | 0 |
| Example 1: Rubber-silica composite a | — | — | — | 10 | — | — | — | — | — | — | — | — | — | — | 2.5 |
| Example 2: Rubber-silica composite b | — | — | — | 20 | — | — | — | — | — | — | — | — | — | — | 5.8 |

TABLE 1-continued

| | | | | | | | | | | | | | | | |
|---|---|---|---|---|---|---|---|---|---|---|---|---|---|---|---|
| Example 3: Rubber-silica composite c | — | — | — | 30 | — | — | — | — | — | — | — | — | — | — | 112 |
| Comparative Example 3: Modified polymer C | 14.1 | 1.9 | 7.4 | 0 | 1.0 | 0.1 | 0.2 | 0.2 | 1.5 | 0.4 | 0.0 | 0.0 | 0.1 | 0.5 | 0 |
| Example 4: Rubber-silica composite d | — | — | — | 30 | — | — | — | — | — | — | — | — | — | — | 5.2 |

("—" in Table 1-b indicates "unmeasured".)

[Preparation and Evaluation of Rubber Composition]

In a first mixing stage, other compounding ingredients excluding sulfur and a vulcanization accelerator were added to and kneaded with the rubber components or rubber-silica composites according to the formulations (parts by mass) shown in Table 2 below using Banbury mixer, and in a final mixing stage, sulfur and a vulcanization accelerator were added to and kneaded with the kneaded materials obtained. Thus, rubber compositions were prepared. The detail of each component in Table 2 excluding rubber components and rubber-silica composites is as follows. The unmodified rubber is a rubber obtained by directly coagulating and drying a natural rubber latex used in Comparative Example 1.

Silica: "NIPSILAQ" manufactured by Tosoh Silica Corporation

Carbon black: "SEAST 3" manufactured by Tokai Carbon Co., Ltd.

Silane coupling agent: Bis(3-triethoxysilylpropyl)tetrasulfide, "Si69" manufactured by EVONIK DEGUSSA Zinc flower: "Zinc Flower Type 1" manufactured by Mitsui Mining & Smelting Co., Ltd.

Age resister: "NOCRAC 6C" manufactured by Ouchi Shinko Chemical Industrial Co., Ltd.

Stearic acid: "LUNAC S-20" manufactured by Kao Corporation

Process oil: "X-140" manufactured by Japan Energy Corporation

Sulfur: "Powdered sulfur for rubber 150 mesh" manufactured by Hosoi Chemical Industry Co., Ltd.

Vulcanization accelerator: "NOCCELER CZ" manufactured by Ouchi Shinko Chemical Industrial Co., Ltd.

Each rubber composition obtained was vulcanized at 160° C. for 20 minutes to prepare a test piece having a predetermined shape. Using the test piece obtained, a dynamic viscoelasticity test was conducted, and low heat generation performance (tan δ (60° C.)) was evaluated, and additionally, tensile characteristics were evaluated. Each evaluation method is as follows.

Low heat generation performance (tan δ (60° C.)): Using a rheospectrometer E-4000 manufactured by USM, loss factor tan δ was measured under the conditions of frequency: 50 Hz, static strain: 10%, dynamic strain: 2% and temperature: 60° C., and its inverse value was indicated by an index as the value of each control being 100. Regarding the control, Comparative Examples 5, 8 and 11 using the modified polymer A and Comparative Example 13 using the modified polymer C were used as the respective controls every silica amount. The tan δ at 60° C. is generally used as an index of low heat generation performance in a rubber composition for a tire. The tan δ is small as the index is increased. Therefore, small tan δ shows that the heat is difficult to be generated and low fuel consumption performance (rolling resistance performance) as a tire is excellent.

Tensile characteristics: Tensile test (dumbbell #3) according to JIS K6251 was conducted to measure 300% modulus, and the value was indicated by an index as the value of each control being 100. M300 is large as the index is increased, and tensile characteristics are excellent.

TABLE 2

| Formulation (parts by mass) | Com. Ex. 4 | Com. Ex. 5 | Com. Ex. 6 | Ex. 5 | Com. Ex. 7 | Com. Ex. 8 | Com. Ex. 9 | Ex. 6 | Com. Ex. 10 | Com. Ex. 11 | Com. Ex. 12 | Ex. 7 | Com. Ex. 13 | Ex. 8 |
|---|---|---|---|---|---|---|---|---|---|---|---|---|---|---|
| Unmodified rubber | 100 | | | | 100 | | | | 100 | | | | | |
| Modified rubber A (Comparative Example 1) | | 100 | | | | 100 | | | | 100 | | | | |
| Modified rubber B (Comparative Example 2) | | | 100 | | | | 100 | | | | 100 | | | |
| Rubber-silica composite a (Example 1) | | | | 102.5 [2.5] | | | | | | | | | | |
| Rubber-silica composite b (Example 2) | | | | | | | | 105.8 [5.8] | | | | | | |
| Rubber-silica composite c (Example 3) | | | | | | | | | | | | 111.2 [11.2] | | |
| Modified polymer C (Comparative Example 3) | | | | | | | | | | | | | 100 | |
| Rubber-silica composite d | | | | | | | | | | | | | | 105.2 [5.2] |

TABLE 2-continued

| Formulation (parts by mass) | Com. Ex. 4 | Com. Ex. 5 | Com. Ex. 6 | Ex. 5 | Com. Ex. 7 | Com. Ex. 8 | Com. Ex. 9 | Ex. 6 | Com. Ex. 10 | Com. Ex. 11 | Com. Ex. 12 | Ex. 7 | Com. Ex. 13 | Ex. 8 |
|---|---|---|---|---|---|---|---|---|---|---|---|---|---|---|
| (Example 4) | | | | | | | | | | | | | | |
| Silica | 2.5 | 2.5 | 2.5 | 0 | 5.8 | 5.8 | 5.8 | 0 | 11.2 | 112 | 11.2 | 0 | 5.2 | 0 |
| Carbon black | 10 | 10 | 10 | 10 | 10 | 10 | 10 | 10 | 10 | 10 | 10 | 10 | 10 | 10 |
| Silane coupling agent | 0.2 | 0.2 | 0.2 | 0.2 | 0.5 | 0.5 | 0.5 | 0.5 | 0.9 | 0.9 | 0.9 | 0.9 | 0.4 | 0.4 |
| Zinc flower | 2 | 2 | 2 | 2 | 2 | 2 | 2 | 2 | 2 | 2 | 2 | 2 | 2 | 2 |
| Process oil | 2 | 2 | 2 | 2 | 2 | 2 | 2 | 2 | 2 | 2 | 2 | 2 | 2 | 2 |
| Age resister | 2 | 2 | 2 | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 | 2 | 2 | 2 |
| Sulfur | 2 | 2 | 2 | 2 | 2 | 2 | 2 | 2 | 2 | 2 | 2 | 2 | 2 | 2 |
| Vulcanization accelerator | 1.5 | 1.5 | 1.5 | 1.5 | 1.5 | 1.5 | 1.5 | 1.5 | 1.5 | 1.5 | 1.5 | 1.5 | 1.5 | 1.5 |
| Properties (Index) | | | | | | | | | | | | | | |
| Low heat generation performance | 90 | 100 | 105 | 108 | 88 | 100 | 107 | 110 | 87 | 100 | 109 | 118 | 100 | 115 |
| Tensile characteristic | 88 | 100 | 101 | 102 | 87 | 100 | 102 | 104 | 85 | 100 | 106 | 109 | 100 | 109 |

(In the Table, numerical number in brackets is amount of silica contained in composite)

The results are shown in Table 2. Comparative Examples 5, 8 and 11 use the modified polymer A, and were excellent in low heat generation performance as compared with the corresponding Comparative Examples 4, 7 and 10 in which unmodified rubber was used. Comparative Examples 6, 9 and 12 further use the silyl-modified polymer B, and further improvement effect in low heat generation performance was appeared as compared with the respective corresponding Comparative Examples 5, 8 and 11. Examples 5, 6 and 7 using the rubber-silica composite in which silica was further formed in the silyl-modified polymer B by in-situ condensation polymerization showed further improvement effect in low heat generation performance as compared with the respective corresponding Comparative Examples 6, 9 and 12. Furthermore, improvement effect in low heat generation performance was appeared in Example 8 using the rubber-silica composite in which silica was formed in the modified polymer C as compared with Comparative Example 13 using the modified polymer C of Comparative Example 3.

The invention claimed is:

1. A method for producing a rubber-silica composite, comprising
changing acido-basic properties of a system containing a polymer fragment obtained by decomposing a diene rubber polymer having a carbon-carbon double bond in a main chain by subjecting the carbon-carbon double bond to oxidative cleavage and a functional molecule having in a structure thereof an alkoxysilyl group and at least one functional group selected from the group consisting of an aldehyde group and a carbonyl group such that the system becomes basic when acidic, and becomes acidic when basic, thereby combining the polymer fragment with the functional molecule to form a modified diene rubber polymer having an alkoxysilyl group incorporated therein, and
adding a silane monomer comprising tetraalkoxysilane and/or alkyl trialkoxysilane to the system containing the modified diene rubber polymer, followed by condensation polymerization, thereby forming silica.

2. The method for producing a rubber-silica composite according to claim 1, wherein the functional molecule having an alkoxysilyl group as a structure is represented by the following formula (A):

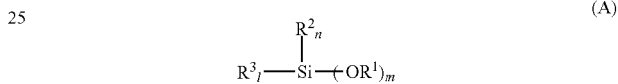

wherein $R^1$ represents an alkyl group or an alkoxyalkyl group, having from 1 to 6 carbon atoms, $R^2$ represents a group containing an aldehyde group or a carbonyl group, $R^3$ represents an alkyl group, m is an integer of from 1 to 3, n is an integer of from 1 to 3 and l is an integer of from 0 to 2.

3. The method for producing a rubber-silica composite according to claim 1, wherein the polymer fragment has a structure represented by the following formula (5) at a terminal:

wherein $R^4$ represents a hydrogen atom, an alkyl group having from 1 to 5 carbon atoms, or a halogen group.

4. The method for producing a rubber-silica composite according to claim 1, wherein the functional molecule having an alkoxysilyl group as a structure is obtained by subjecting a carbon-carbon double bond of a functional molecule having at least one vinyl group to oxidative cleavage.

5. The method for producing a rubber-silica composite according to claim 1, wherein the modified diene rubber polymer has at least one selected from the group consisting of groups represented by the following formulae (B1) to (B4) in the molecule:

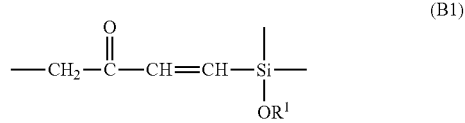

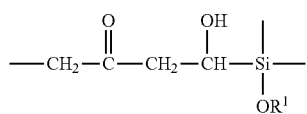
(B2)

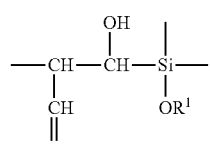
(B3)

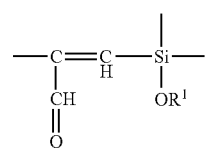
(B4)

wherein R¹ represents an alkyl group or an alkoxyalkyl group, having from 1 to 6 carbon atoms.

6. The method for producing a rubber-silica composite according to claim 1, wherein the modified diene rubber polymer contains a structure represented by the following formula (C5):

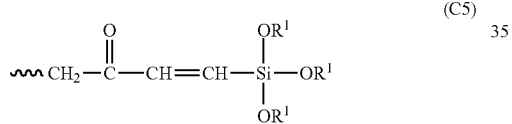
(C5)

wherein R¹ represents an alkyl group or an alkoxyalkyl group, having from 1 to 6 carbon atoms, and a portion indicated by a wavy line is a diene polymer chain.

7. The method for producing a rubber-silica composite according to claim 1, wherein the modified diene rubber polymer has a structure in which diene polymer chains are linked through a linking group represented by the following formula (F1):

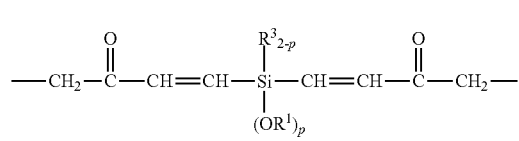
(F1)

wherein R¹ represents an alkyl group or an alkoxyalkyl group, having from 1 to 6 carbon atoms, R³ represents an alkyl group, and p is a number of 1 or 2.

8. The method for producing a rubber-silica composite according to claim 1, wherein the modified diene rubber polymer has a structure in which a diene polymer chain is linked to three sides with a linking group represented by the following formula (G1) as the center:

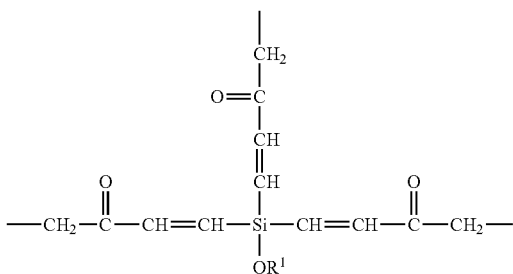
(G1)

wherein R¹ represents an alkyl group or an alkoxyalkyl group, having from 1 to 6 carbon atoms.

9. A rubber-silica composite comprising a modified diene rubber polymer having incorporated in a molecule thereof at least one selected from the group consisting of groups containing a silicon atom represented by the following formulae (D1) to (D4), and silica bonded to the silicon atom of the modified diene rubber polymer through a siloxane bond

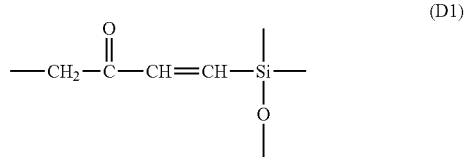
(D1)

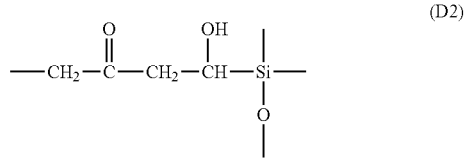
(D2)

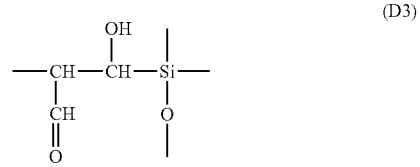
(D3)

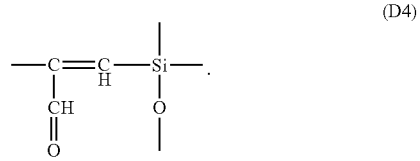
(D4)

10. The rubber-silica composite according to claim 9, wherein the modified diene rubber polymer has at least one linking group selected from the group consisting of linking groups represented by the following formulae (1) to (4) in the molecule, and has a structure in which diene polymer chains are linked through the linking group

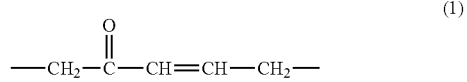
(1)

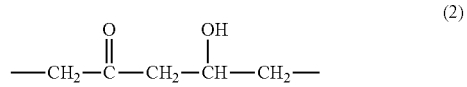
(2)

-continued

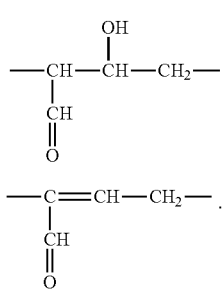

11. The rubber-silica composite according to claim 9, wherein the silica is contained in an amount of from 1 to 50 parts by mass per 100 parts by mass of the modified diene rubber polymer.

12. A rubber composition comprising the rubber-silica composite according to claim 9.

13. A pneumatic tire comprising the rubber composition according to claim 12.

14. A pneumatic tire according to claim 13, comprising the rubber composition as a tread.

* * * * *